United States Patent [19]

Lien

[11] 4,372,565
[45] Feb. 8, 1983

[54] SOFT METAL SEAL

[75] Inventor: Neil C. Lien, Evansville, Wis.

[73] Assignee: Baker Manufacturing Company, Evansville, Wis.

[21] Appl. No.: 244,606

[22] Filed: Mar. 17, 1981

[51] Int. Cl.³ .................. B21D 39/00; F16L 23/00
[52] U.S. Cl. ................................. 277/236; 277/167.5
[58] Field of Search .................. 277/236, 167.5, 177

[56] References Cited

U.S. PATENT DOCUMENTS

| | | | |
|---|---|---|---|
| 1,567,813 | 12/1925 | Oleson | 277/167.5 |
| 2,614,793 | 10/1952 | Storm | 277/177 |
| 3,204,971 | 9/1965 | Meriano | 277/167.5 |
| 3,490,777 | 1/1970 | Emmerson . | |
| 3,520,544 | 7/1970 | Taylor . | |
| 3,637,223 | 1/1972 | Weber . | |
| 3,690,682 | 9/1972 | Furrill . | |
| 3,724,064 | 4/1973 | Mott . | |
| 3,898,136 | 8/1975 | Mott . | |

OTHER PUBLICATIONS

IEEE Transactions on Nuclear Science, vol. NS-128, No. 3, Jun. 1981, "An All Metal UHV Flange Seal for Dissimilar Metals".
Vol. 14, "Vacuum Physics & Technology" of Methods of Experimental Physics, 1979, pp. 279-297.
The Journal of Vacuum Science & Technology, vol. 3, No. 3, May/Jun. 1966, "Unbaked, Ungrooved Bolted Vacuum Connection Flanges, etc."

*Primary Examiner*—Robert I. Smith
*Attorney, Agent, or Firm*—Isaksen, Lathrop, Esch, Hart & Clark

[57] ABSTRACT

A improved high pressure seal for sealing between a pair of vacuum system elements (10, 12) is disclosed which includes a channel (42) to allow fluid to be vented from the space between a sealing member (30) and a seal on the low pressure side of one of the elements (10, 12) to prevent the trapping of gasses inside of the seal which can contribute to outgassing at a later time. The venting channel (42) is formed either in the deformable sealing member (30) itself, or in one of the two vacuum system elements (10, 12) in its face adjoining the sealing member (30).

8 Claims, 7 Drawing Figures

SOFT METAL SEAL

FIELD OF THE INVENTION

The present invention relates to high pressure seals in general, and, in particular, to vacuum seals including deformable sealing elements provided therein.

DESCRIPTION OF THE PRIOR ART

The prior art is generally cognizant of the use in evacuated system of deformable metallic seals which are pressed between a pair of vacuum system elements so as to form a fluid-tight seal. An example of such a seal is shown in U.S. Pat. No. 3,724,064. It has been generally suggested in a variety of prior art that other deformable metal seals may be utilized, as illustrated in U.S. Pat. Nos. 3,490,777, 3,520,544, 3,637,223, 3,690,682, and 3,898,136. Furthermore, the use of deformable and compressible metallic seals in vacuum system equipment is widespread in the art. These examples of the prior art contain no teaching of any methods to evacuate either side of the deformable metallic seals so as to prevent the trapping of gas or liquid between such a seal and the adjacent elements.

SUMMARY OF THE INVENTION

The present invention is summarized in that a high pressure seal for sealing between first and second vacuum system elements includes an annular deformable metallic sealing member which has a central ridge formed in it in its undeformed condition and which is held between the elements in a flattened condition, the sealing member having a pair of faces and inner and outer sealing edges; a sealing shoulder formed on each of the elements arranged so as to abut and seal against a respective one of the sealing edges on the sealing member; and one of the group composed of the sealing member and the two elements having at least one channel formed therein to allow fluid, confined by the ridge in the sealing member between the sealing member and one of the elements, to be drawn into the interior of the elements to avoid the possibility of later outgassing from the confined fluid.

It is an object of the present invention to provide a deformable metallic seal for high vacuum fluid handling equipment in which a method is provided for venting one complete face of the seal to the low pressure side of the seal so as to prevent trapped gas from outgassing during the operation of the vacuum equipment.

It is another object of the present invention to provide such a fluid-tight seal without the addition of any unnecessary or additional sealing elements.

It is a further object of the present invention to provide such a high pressure seal which eliminates the possibility of outgassing of any trapped gasses but which is both economical to manufacture and easy to utilize and install.

Other objects, features and advantages of the present invention will become apparent from the following specification when taken in conjunction with the accompanying drawings.

DESCRIPTION OF THE PREFERRED EMBODIMENT

Figure 1:
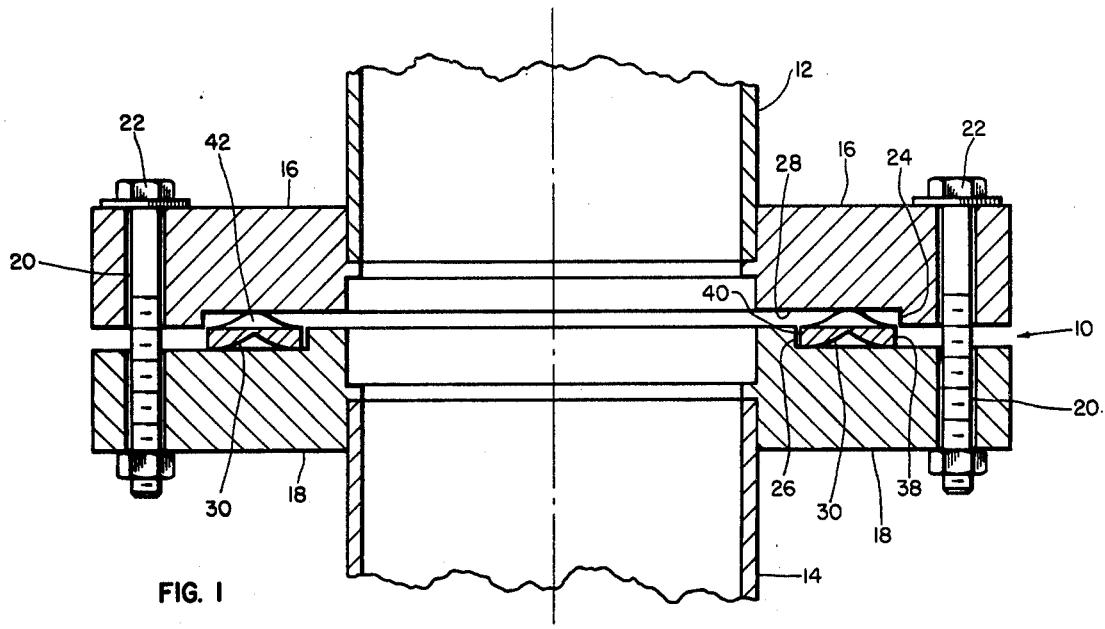
FIG. 1 is a cross sectional view of a pair of vacuum system elements having a high pressure seal in accordance with the present invention installed therein.

Shown in FIG. 1 is a high pressure seal, generally indicated at 10, constructed in accordance with the present invention. The seal 10 is used to join a pair of vacuum system elements 12 and 14 together in a fluid-tight fashion capable of surviving exposure to high pressures. The vacuum system elements 12 and 14, which are to be joined, may be of any suitable type conventional utilized in the art of vacuum handling equipment, and while the seal is illustrated herein in conjunction with the joining of two cylindrical elements, it is envisioned that a similar seal may be utilized in any manner of pressurized fluid handling equipment wherein a high pressure seal between two elements of the system is required. Thus, while the seal as disclosed in this specification is particularly well adapted for use in high vacuum containing systems, it can also be utilized in any high pressure fluid handling system as may be appropriate.

In the vacuum seal 10, each of the vacuum system elements 12 and 14 includes provided thereon a respective peripheral flange 16 and 18. Each of the peripheral flanges 16 and 18 extends circumferentially around the respective element 12 and 14, and each of the flanges 16 and 18 is periodically pierced by a hole 20 so that suitable fastening means, as for example a bolt 22, may be inserted through the respective holes 20 to secure the flanges 16 and 18 together in a tight fashion. In FIG. 1, the seal 10 is illustrated with the bolts 22 loosened to aid in illustrating the internal structure thereof. In the example of FIG. 1, the interior of the elements 12 and 14 is intended to be where the vacuum is imposed, and thus may be referred to as the low pressure side of the seal, while the exterior of the elements 12 and 14, which remains at atmospheric pressure, may be referred to as the high pressure side of the seal.

Each of the flanges 16 and 18 on the elements 12 and 14 is provided with a respective sealing shoulder 24 and 26. The sealing shoulders 24 and 26 are smooth surfaces which are annular in shape and are sized approximately equal in size to the sealing edges of the sealing member as will be described below. The sealing shoulders 24 and 26 are spaced from each other so as to create therein a sealing member cavity 28 designed therein to receive a sealing member 30.

Figure 2:
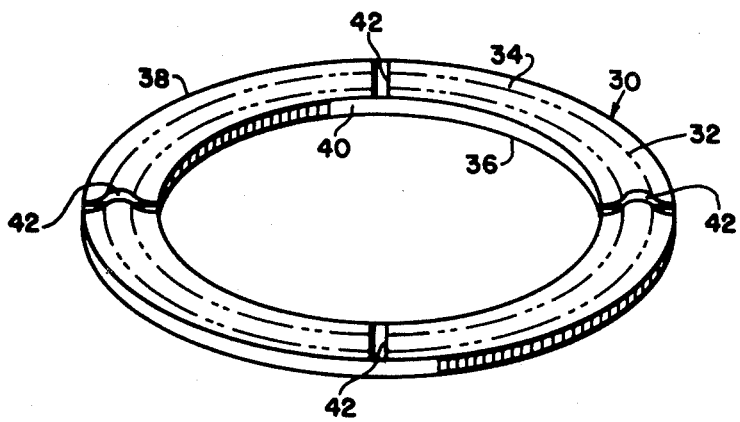
FIG. 2 is a perspective view of the sealing member of the seal of FIG. 1.

The sealing member 30 is an annular ring of soft metallic material designed to be received in the sealing member cavity 28. The sealing member 30 is formed of a relatively soft metal material, such as aluminum, copper, or soft steel and is "soft" in the sense that it may be deformed by the remainder of the apparatus illustrated in FIG. 1. The sealing member 30 is sized and shaped so as to be received with the sealing member cavity 28 extending around the periphery of the seal 10. While in most circumstances this will result in the sealing member 30 being annular in shape so as to extend completely around the periphery of the seal, the shape of the sealing member 30 can be altered to conform to the shape of the vacuum system elements in which the seal is installed. A perspective view of the sealing member 30 of FIG. 1 is shown in FIG. 2, where it can be seen that throughout its length the sealing member 30 is provided with a single corrugation which results in a ridge 32 of annular shape being positioned along the center line of the sealing member 30. The sealing member 30 has a top face 34 and a bottom face 36 and is provided with a pair of outer and inner sealing edges 38 and 40 at each annular edge of the sealing member 30. Each of the sealing edges 38 and 40 is designed to be of a size to roughly correspond to the dimensions of the sealing shoulders 24 and 26 formed in each of the flanges 16 and 18 of the elements 12 and 14. A plurality of radially extending venting channels 42 are formed in the top surface of the sealing member 30. Each of the channels 42 consists of a radially extending channel cut through the top of the ridge 32 and thus cut part way through, but not all the way through, the sealing member 30. Each of the channels 42, as may be seen with more detail in FIG. 1, allows fluid communication into the interior of the elements 12 and 14 from the area between the face 34 of the sealing member 30 and the interior surface of the element 12.

In assembling the high pressure seal 10 of FIG. 1, the sealing member 30 is placed in the sealing member cavity 28 between the sealing shoulders 24 and 26, and the flanges 16 and 18 are then pressed together. The attachment means, such as the bolt 22, is inserted through the hole 20 and then is progressively tightened, drawing the flanges 16 and 18 together. As the flanges 16 and 18 are pressed together, the sealing member 30 is depressed, and the annular ridge 32 of the sealing member 30 is slowly flattened. This flattening of the ridge 32 causes a deformation of the sealing member 30, and the sealing member 30 gradually flattens, pressing its outer and inner sealing edges 38 and 40 against the respective sealing shoulders 24 and 26 provided on the flanges 16 and 18. The heart of the seal between the sealing member 30 and the flanges 16 and 18 is thus provided by this firm and intimate contact under pressure between the sealing edges 38 and 40 of the sealing member 30 and the respective sealing shoulders 24 and 26. The seal is completed when the flanges 16 and 18 are held tightly in firm abutting contact with each other with the sealing member 30 held in a flattened, deformed condition therebetween.

After the seal has been tightened in such a fashion, a vacuum may be applied to the interior of the elements 12 and 14. When such a vacuum is applied, outgassing of trapped gasses held between various elements of the vacuum system can occur at all points within the system. Thus, specifically in the seal 10, any gas trapped in the low pressure side of the sealing member cavity 28, i.e. between the sealing member 30 and the flange 16, would tend to be drawn between the flanges 16 and 18 and into the vacuum in the interior of the elements 12 and 14. By allowing all the gas to be drawn from the low pressure side of the sealing member cavity 28 when the initial vacuum is applied to the interior of the elements 12 and 14, there is no residual gas trapped there that might outgas to degrade the vacuum at a later time. The passage of gas from the outside, or high pressure side of the seal 10, through the seal is prevented by the firm abutting contact between the sealing edges 38 and 40 of the sealing member 30 and the sealing shoulders 24 and 26 provided on the flanges 16 and 18 of the elements 12 and 14.

It is the provision for the venting channel 42 that provides the most significant advantage for the high pressure seal of the present invention. The venting channel 42 insures that the low pressure side of the seal, the area between the top face 34 of the sealing member 30 and flange 16, is completely evacuated when the vacuum is applied to the system to help prevent outgassing at a later time which might degrade the quality of the vacuum on the interior of the sealing of the elements 12 and 14. Such outgassing is prevented by avoiding the possibility of a trapped pocket of gas which might otherwise be created between the sealing member 30 and the flange 16 since the ridge 32 might prevent any gas on the opposite side of the ridge 32 from being evacuated when a pressure is applied to the interior of the elements 12 and 14 because of the firm, and potentially fluid-tight, seal between the top of the ridge 32 and the inside of the flange 16. By providing the venting channel 42, it is insured that all the gasses which are caught on the wrong side of the ridge 32 have a passage to the low pressure side of the seal 10 from which they may be evacuated. Thus, as the vacuum is initially applied to the interior of the elements 12 and 14, this pocket of gas is drawn out completely at that time, thus eliminating the possibility of any outgassing at a later time. Thus the provision of the venting channel 42 insures that the area between the ridge 32 and the sealing shoulder 24 of the flange 16 is completely evacuated to the low pressure side of the seal 10, and thus prevents any possibility that a pocket of gas could be held in a fluid-tight fashion under pressure so as to contribute to outgassing at a later, more critical time into the apparatus.

Shown in FIGS. 3 to 7 are alternative versions for the seal constructed in accordance with the present invention. Each of the alternative embodiments has the elements which are similar in function to the elements of the seal of FIG. 1 denominated with similar reference numerals with a multiple of 100 added thereto.

Figure 3:
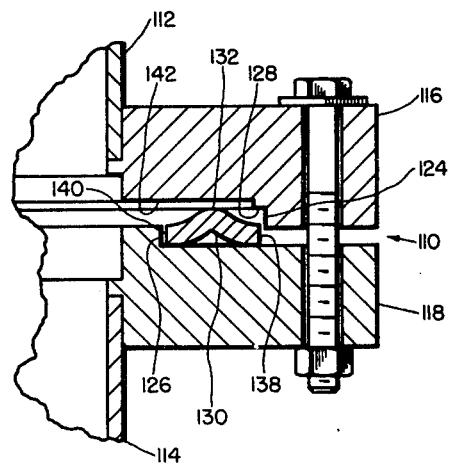
FIG. 3 is an alternative embodiment of a high pressure seal constructed in accordance with the present invention illustrated as installed joining a pair of vacuum system elements.
Figure 4:
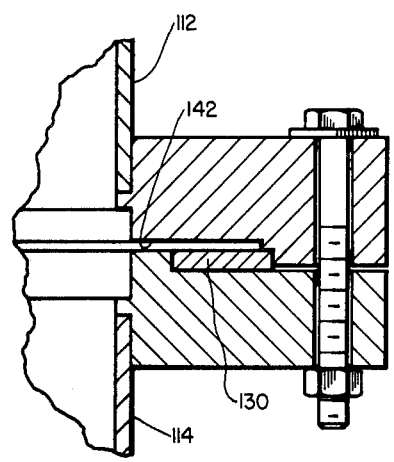
FIG. 4 is an illustration similar to FIG. 3 of the seal as it appears in use after the sealing member has been deformed.

In the embodiment of FIGS. 3 and 4, the sealing member 130 is again annular in shape with a ridge 32 provided extending therealong. However, in the apparatus of FIGS. 3 and 4, at least one venting channel 142 is provided in the upper surface of the sealing member cavity 28 on the inside surface of the flange 116. The venting channel 142 again extends radially outward from the inside of the interior of the elements 112 and 114 into the sealing member cavity 128 to a point which is beyond the point at which the top of the ridge 132 contacts the inside of the sealing member cavity 128. Several of the venting channels 142 are provided at spaced intervals in a radial fashion around the periphery of the flange 116.

As can be seen in FIG. 4, the venting channels 142 allow for a complete evacuation of all of the gasses on the low pressure side of the sealing member 130, through the venting channels 142 into the interior of the elements 112 and 114. Yet the provision for the venting channel 142 in no way interferes with the operation of the sealing member 130 which is completely compressed and deformed, as viewed in FIG. 4, so that its sealing edges 136 and 138 contact the sealing shoulders 124 and 126 provided in the flanges 116 and 118 respectively.

On occasion it may be desirous for the ridge provided in the sealing member to be located on the high pressure side of the seal rather than on the low pressure side as has been illustrated in FIGS. 1 to 4. In the seal illustrated in FIG. 5, the ridge 232 in the sealing member 230 still faces upward toward the flange 216, but the sealing shoulder 224 on the flange 216 has been located on the low pressure side of the seal, while the sealing shoulder 226 on the flange 218 has been located toward the high pressure side of the seal, so that it is the underside of the sealing member 230 which is exposed to the low pressure side of the seal. To allow trapped gasses to escape from the underside of the sealing member 230 as it is compressed, at least one venting channel 242 is provided in the upper surface of the flange 218 extending into the sealing member cavity 228 past the ridge 232 under the sealing member 230. Similar in fashion to the venting channels 142 of FIGS. 1 and 3, the venting channels 242 of this embodiment are preferably provided at spaced intervals around the circumference of the flange 218 and extend radially outwardly sufficiently far into the sealing member cavity 228 to evacuate the complete underside of the sealing member 230 as it is flattened. As the sealing member 230 is flattened, the sealing edges 238 and 240 of the sealing member 230 contact the sealing shoulders 224 and 226 of the flanges 216 and 218 to seal there against, and as a vacuum is applied to the interior of the elements 212 and 214, all the gasses trapped underneath the sealing member 230 evacuate through the venting channel 242 to the interior of the appratus, from which they may be removed entirely, so that a fluid-tight seal is created with the possibility of later outgassing minimized.

Figure 5:
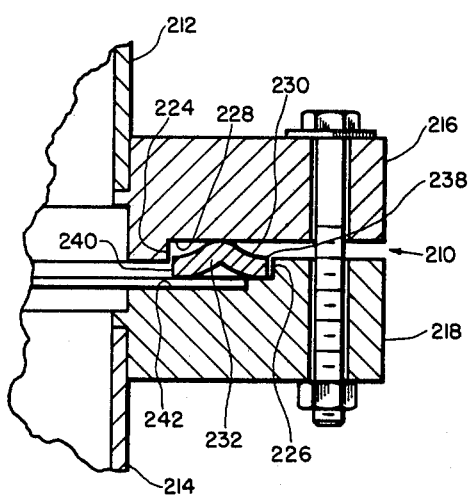
FIG. 5 is another alternative embodiment of a high pressure seal constructed in accordance with the present invention.
Figure 6:
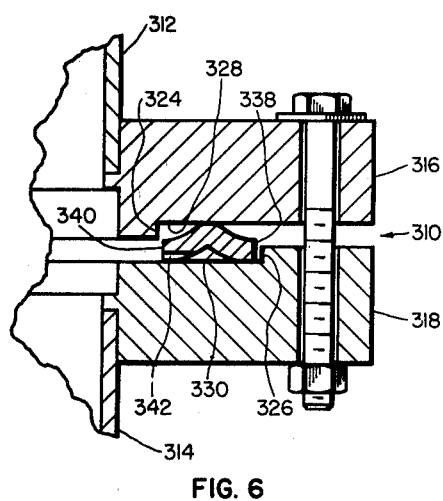
FIG. 6 is an illustration of yet another alternative embodiment of a high pressure seal constructed in accordance with the present invention.
Figure 7:
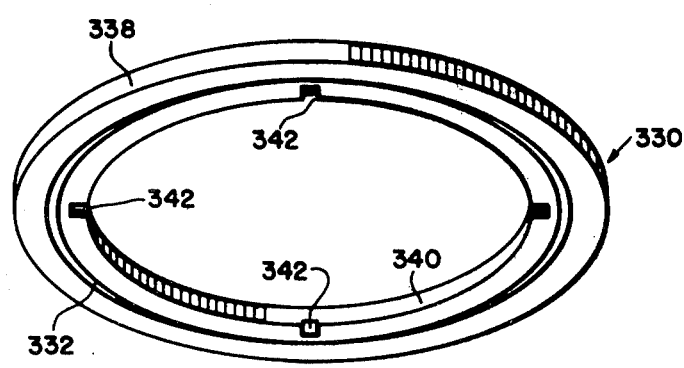
FIG. 7 is a perspective view of the sealing member of the apparatus of FIG. 6.

Shown in FIGS. 6 and 7 is a final alternative embodiment of the present invention in which, as in the embodiment of FIG. 5, the ridge in the sealing member is oriented toward the high pressure side of the seal. In this embodiment, the venting channel 342 is provided in the sealing member 330 rather than in the peripheral flange 318 into which it is inserted. As can be seen in FIG. 6, the sealing member 330 rather than in the peripheral flange 318 into which it is inserted. As can be seen in FIG. 6, the sealing member 330 is provided with a plurality of the radially extending venting channels 342 on the underside thereof with the venting channels 342 extending underneath the sealing member 330 to a point at least as far as the underside of the ridge 332. The sealing member 330 is positioned inside of the seal in such a fashion that the venting channels 342 are on the low pressure side of the seal thus created so the gasses trapped underneath the sealing member 330 as it is flattened can exit through the venting channels 342 to the interior of the elements 312 and 314.

It can be readily ascertained, by comparison of the various embodiments disclosed and illustrated herein, that the compressible seal in accordance with the present invention can be constructed in a number of ways and that the venting channel of the present invention can be constructed as a part of the sealing member itself or can be constructed as a part of the elements surrounding the sealing member. In either circumstance, it is crucial that the venting channel extend into the low pressure side of the seal, which would be the interior of the elements if the elements are designed to conduct a vacuum. The venting channel must extend from the low pressure side of the vacuum system elements past the ridge or deformable portion of the sealing member so that all trapped gasses have a path so that they may be evacuated from the low pressure side of the seal. In this fashion, a source of outgassing in such a vacuum seal is eliminated and a secure fluid-tight seal with less outgassing is created without the addition of any additional structural elements or other apparatus being required. According to the present invention, therefore, less vacuum pumping would be required than would otherwise be the case and a more reliable seal is created.

It is to be understood that the present invention is not limited to the particular construction and arrangement of parts disclosed and illustrated herein, but embraces all such modified forms thereof as come within the scope of the following claims.

I claim:

1. A high pressure seal for sealing between first and second vacuum system elements comprising:

an annular deformable metallic sealing member which has a central ridge formed in it in its undeformed condition and which is held pressed between the elements in a flattened condition, the sealing member being deformed in its flattened condition to substantially conform to the shape of the cavity between the elements and to substantially fill the cavity, the sealing member having a pair of faces and inner and outer sealing edges, a sealing shoulder formed on each of the elements arranged so as to abut and seal against a respective one of the sealing edges on the sealing member, and one of the group composed of the sealing member and the two elements having at least one channel formed therein to allow any fluid confined by the ridge in the sealing member between the sealing member and a one of the elements to be drawn into the interior of the elements to avoid the possibility of later outgassing from the confined fluid.

2. A high pressure seal as claimed in claim 1 wherein the channel is formed in the sealing member, the channel extending radially along the surface of the sealing member at least as far as the ridge therein.

3. A high pressure seal as claimed in claim 2 wherein the channel is formed on the same side of the sealing member as the ridge therein.

4. A high pressure seal as claimed in claim 2 wherein the channel is formed on the opposite side of the member from the ridge therein.

5. A high pressure seal as claimed in claim 1 wherein the channel is formed in the face of one of the elements.

6. A high pressure seal for sealing between first and second vacuum system elements comprising:

an annular deformable metallic sealing member which has a center ridge formed in it in its undeformed condition and which is held pressed between the elements in a flattened condition, the sealing member being deformed in its flattened condition to substantially conform to the shape of the cavity between the elements and to substantially fill the cavity, the sealing member having a pair of faces and inner and outer sealing edges, a sealing shoulder formed on each of the elements arranged so as to abut and seal against a respective one of the sealing edges on the sealing member, and the sealing member having at least one radially extending channel cut through the ridge formed in it to allow fluid, confined behind the ridge between the sealing member and one of the elements, to be drawn into the interior of the elements to avoid the possibility of later outgassing from the confined fluid.

7. A high pressure seal for sealing between first and second vacuum system elements comprising:
- an annular deformable metallic sealing member which has a central ridge formed in it in its undeformed condition and which is held pressed between the elements in a flattened condition, the sealing member being deformed in its flattened condition to substantially conform to the shape of the cavity between the elements and to substantially fill the cavity, the sealing member having a pair of faces and inner and outer sealing edges,
- a sealing shoulder formed on each of the elements arranged so as to abut and seal against a respective one of the sealing edges on the sealing member, and
- the sealing member having at least one radially extending channel formed therein on the side thereof opposite from the ridge, the channel allowing fluid confined between the sealing member and one of the elements to be drawn out into the interior of the elements to avoid the possibility of later outgassing from the confined fluid.

8. A high pressure seal for sealing between first and second vacuum system elements comprising:
- an annular deformable metallic sealing member which has a central ridge formed in it in its undeformed condition and which is held pressed between the elements in a flattened condition, the sealing member being deformed in its flattened condition to substantially conform to the shape of the cavity between the elements and to substantially fill the cavity, the sealing member having a pair of faces and inner and outer sealing edges,
- a sealing shoulder formed on each of the elements arranged so as to abut and seal against a respective one of the sealing edges on the sealing member, and
- one of the elements having at least one radially extending channel formed in its extending in it past the ridge in the sealing member, the channel allowing fluid to be drawn into the interior of the elements from the space between the sealing member and element in which the channel is formed to avoid the possibility of later outgassing from the confined fluid.

* * * * *